United States Patent [19]

Matsumoto

[11] Patent Number: 4,986,325
[45] Date of Patent: Jan. 22, 1991

[54] PNEUMATIC TIRE INCLUDING SIPES

[75] Inventor: Hiroyuki Matsumoto, Tachikawa, Japan

[73] Assignee: Bridgestone Corporation, Osaka, Japan

[21] Appl. No.: 345,335

[22] Filed: May 1, 1989

Related U.S. Application Data

[62] Division of Ser. No. 61,521, Jun. 15, 1987.

[30] Foreign Application Priority Data

Jun. 13, 1986 [JP] Japan .................................. 61-137546
Mar. 11, 1987 [JP] Japan .................................. 62-55668

[51] Int. Cl.⁵ .............................................. B60C 11/12
[52] U.S. Cl. ........................... 152/209 R; 152/DIG. 3
[58] Field of Search .......... 152/209 R, 209 D, DIG.3

[56] References Cited

U.S. PATENT DOCUMENTS

| 2,094,636 | 10/1937 | Bull ................................ 152/DIG. 3 |
| 2,104,532 | 1/1938 | Sommer ......................... 152/DIG. 3 |
| 4,566,514 | 1/1986 | Mauk et al. . |
| 4,598,747 | 7/1986 | Flechtner . |
| 4,723,584 | 2/1988 | Yamaguchi et al. .......... 152/DIG. 3 |

FOREIGN PATENT DOCUMENTS

| 0235830 | 9/1987 | European Pat. Off. . |
| 0246996 | 11/1987 | European Pat. Off. . |
| 2455130A1 | 5/1976 | Fed. Rep. of Germany . |
| 43383 | 5/1934 | France .......................... 152/DIG. 3 |
| 251204 | 11/1987 | Japan ........................... 152/DIG. 3 |
| 727207 | 3/1955 | United Kingdom . |
| 2017597 | 10/1979 | United Kingdom . |
| 2053817 | 2/1981 | United Kingdom . |
| 2093777 | 9/1982 | United Kingdom ......... 152/DIG. 3 |
| 84/00329 | 2/1984 | World Int. Prop. O. . |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A pneumatic tire comprises a plurality of main grooves in a tread of the tire. The main grooves substantially circumferentially extend and are spaced apart from each other in an axial direction of the tire. Each the main groove is continuous. Intersection angles between an equatorial plane of the tire and tangents to each the main groove are larger from a starting end to a terminal end of the main groove opening at a tread end of the tire. Th pneumatic tire further comprises a plurality of sipes in a tread of the tire. The sipes extend substantially in axial directions of the tire but are inclined relative to the equatorial plane of the tire and spaced apart from each other in circumferential directions. Each the sipe is inclined with its opening directing forward in a rotating direction of the tire.

4 Claims, 14 Drawing Sheets

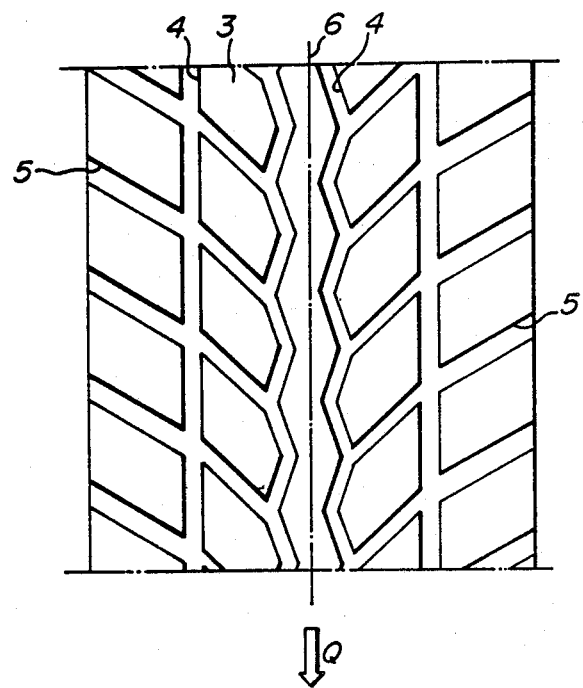
FIG_2
PRIOR ART

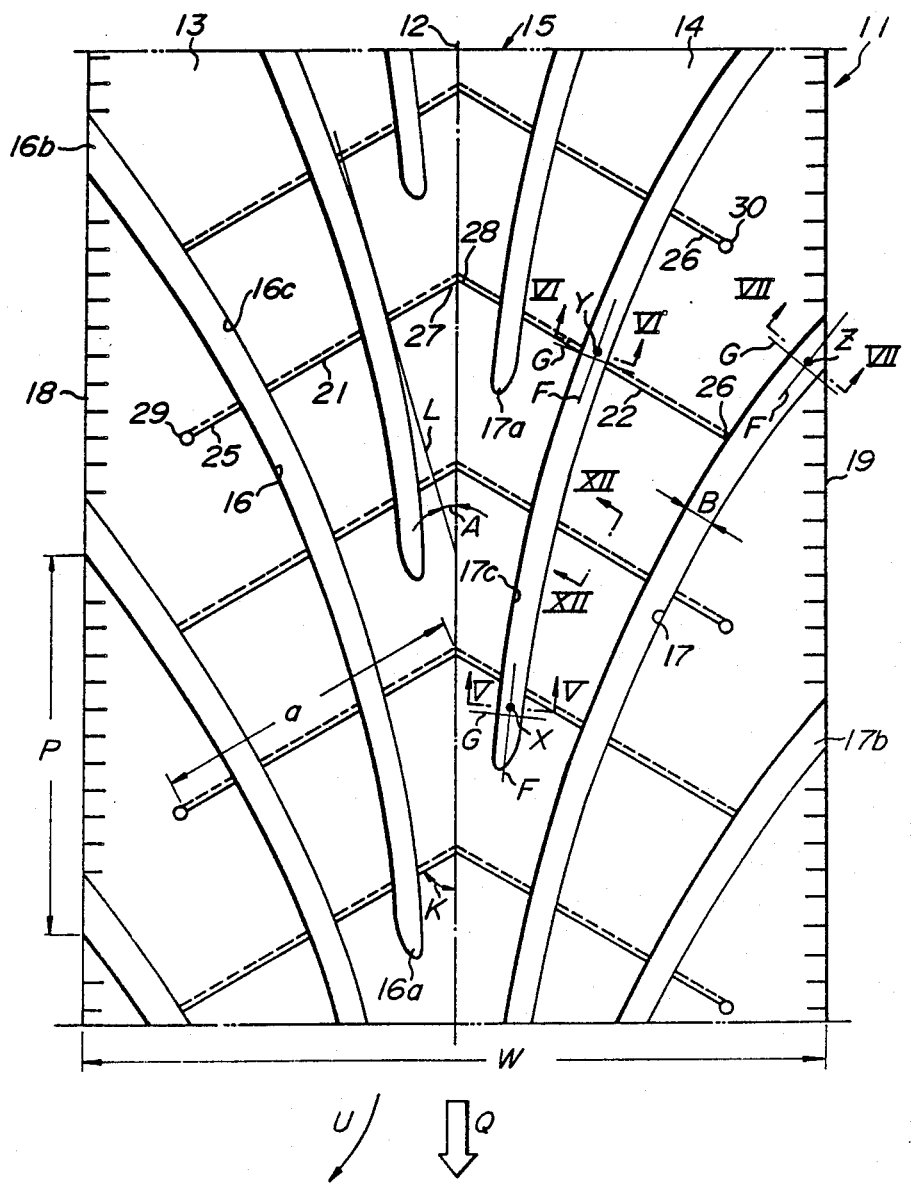
FIG_3

FIG_4
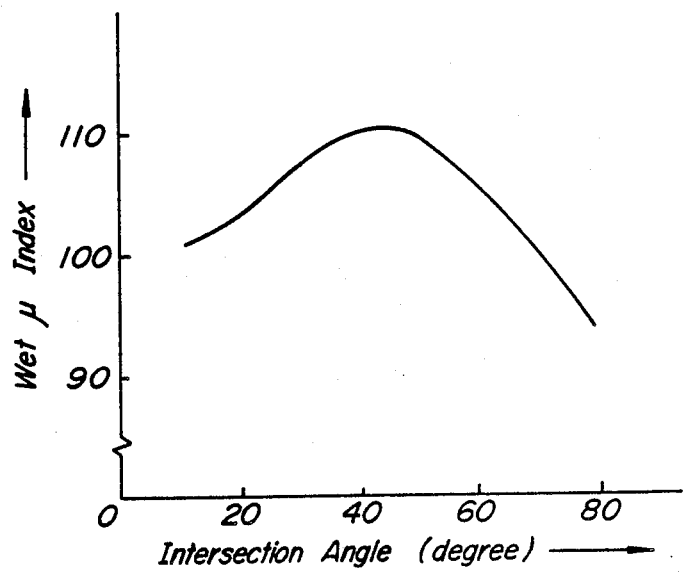
FIG_5
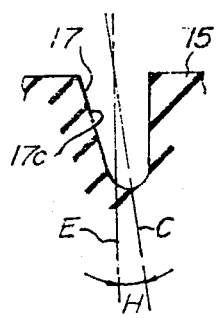
FIG_6
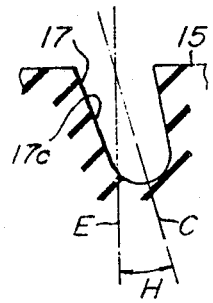
FIG_7
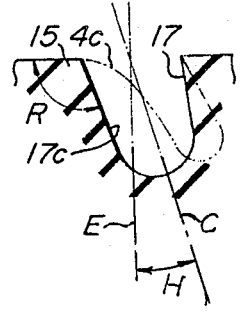

FIG_8
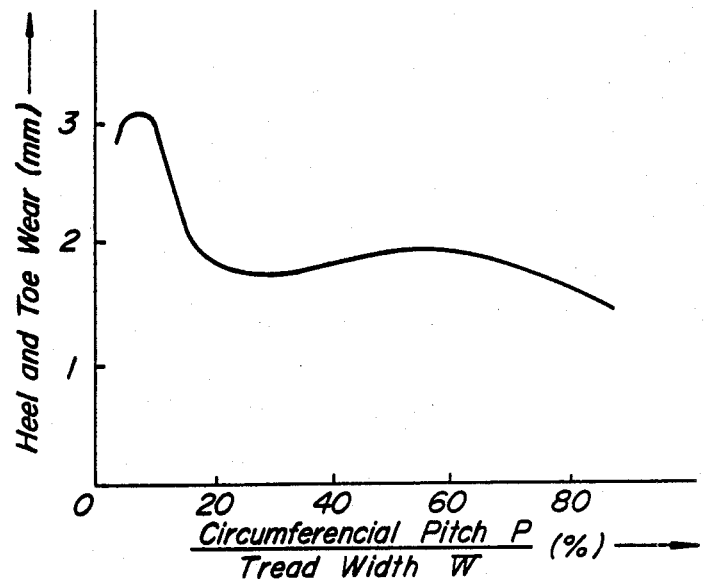
FIG_9
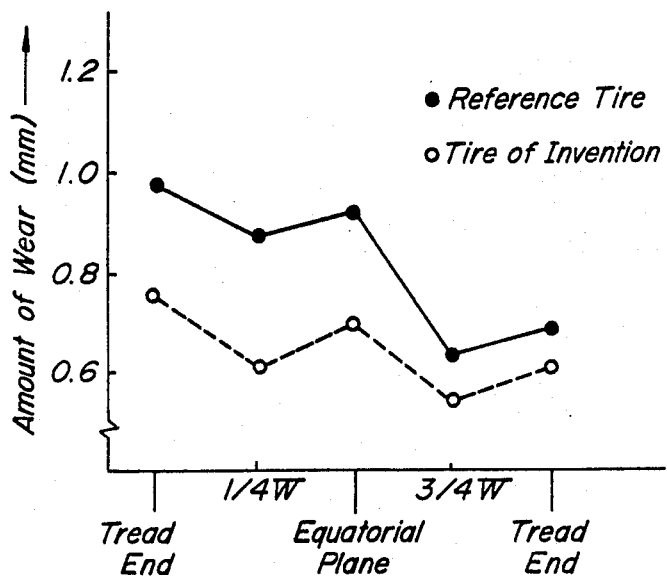

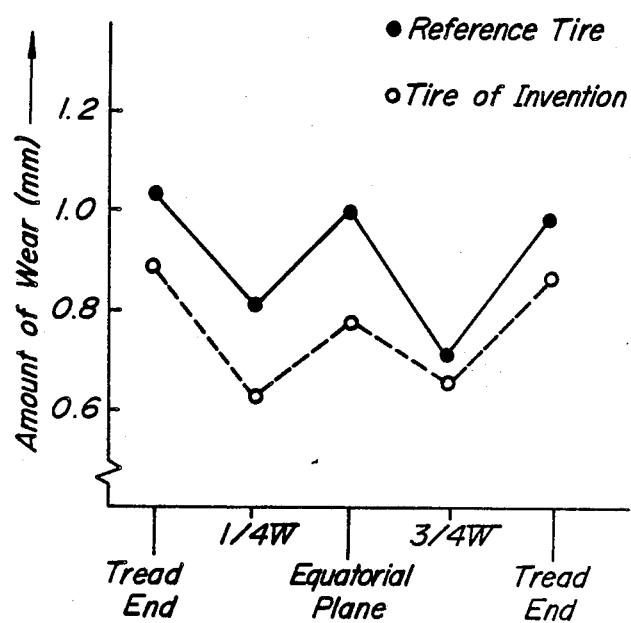
FIG_10

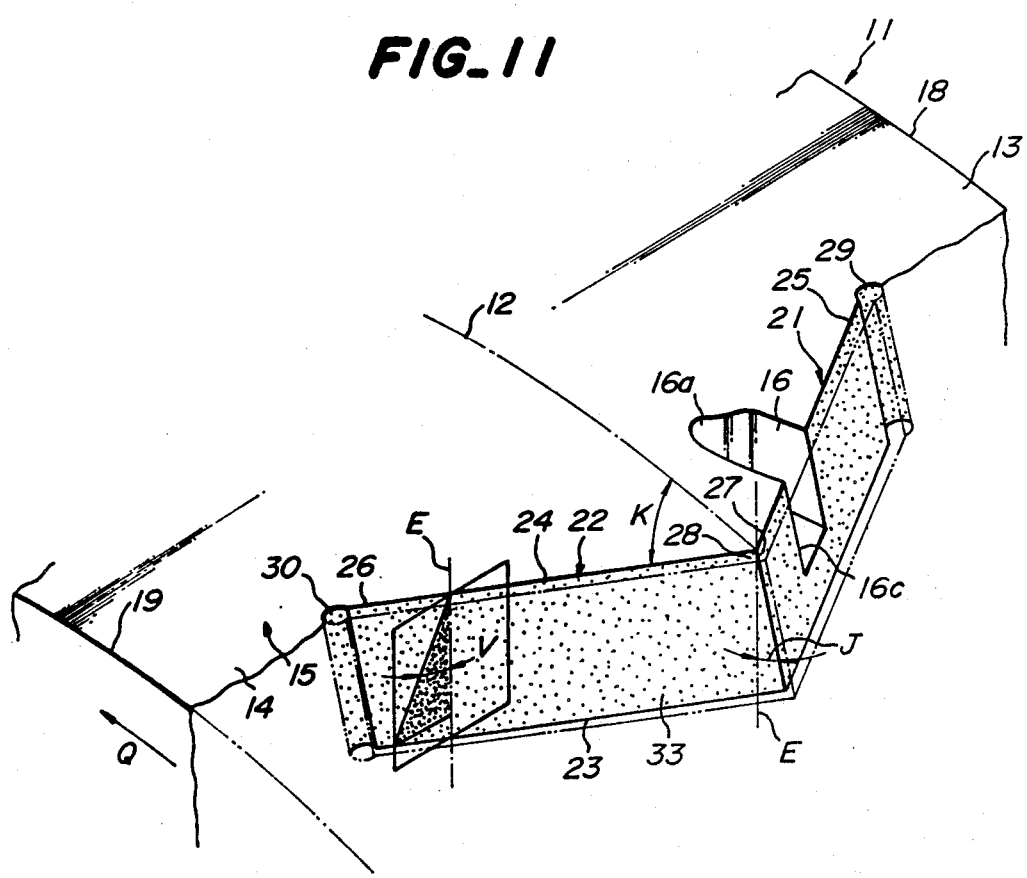
FIG_11

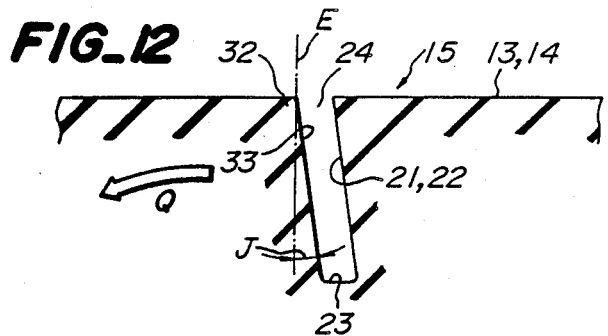
FIG_12
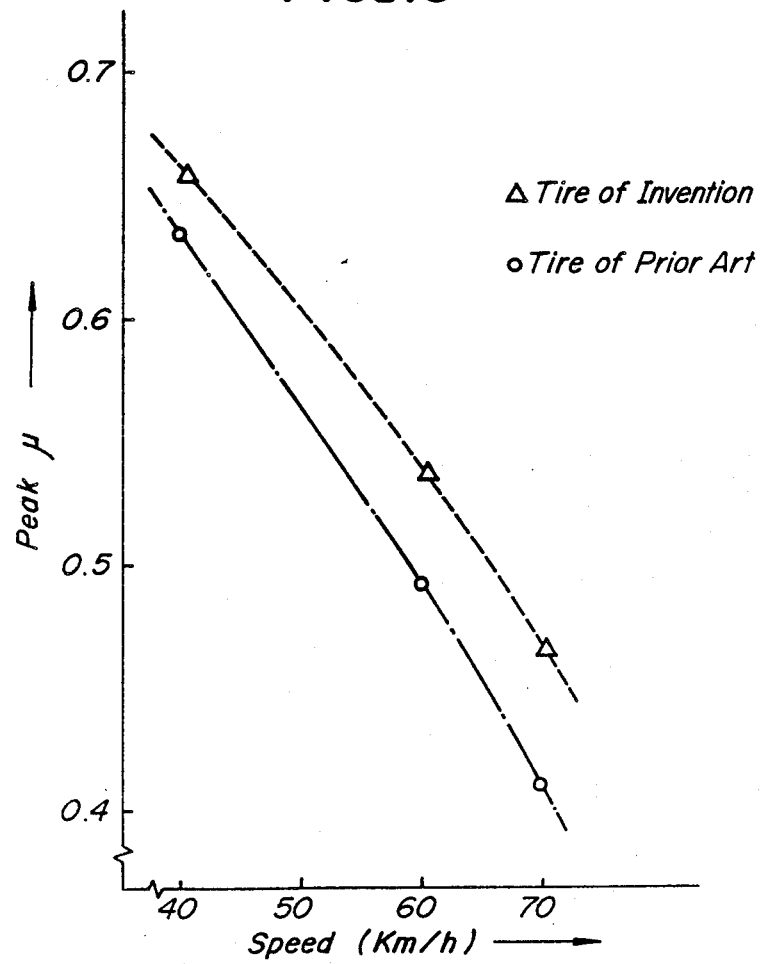
FIG_13

FIG._14
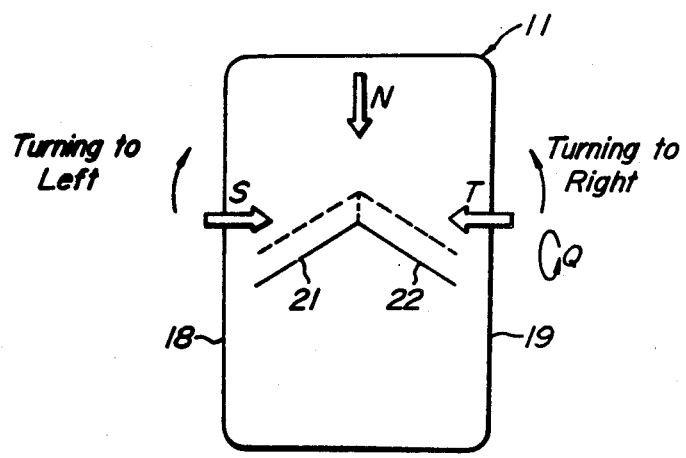
FIG._15
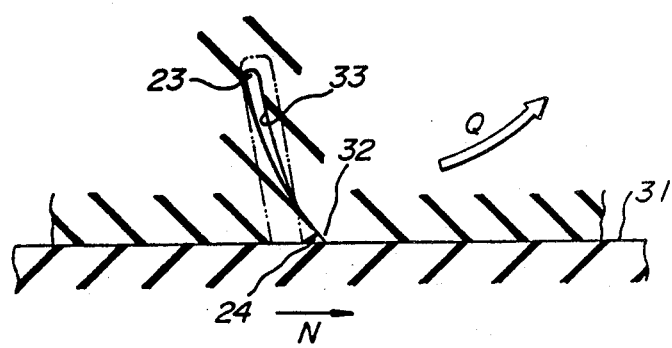

FIG_16
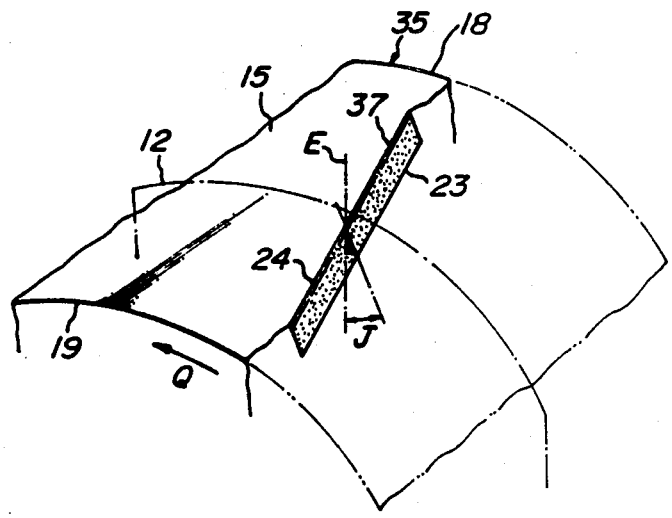
FIG_17
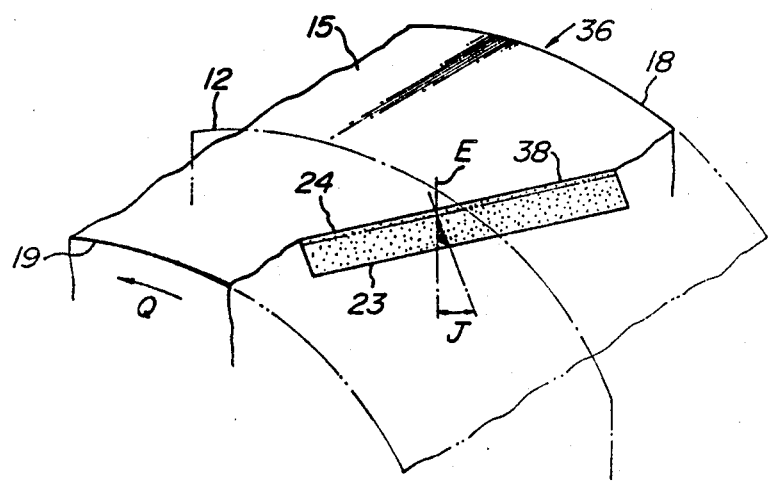

FIG_18
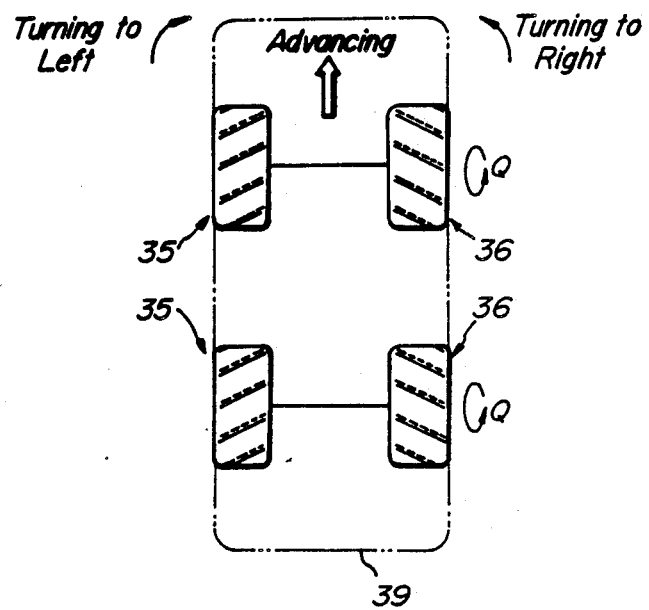

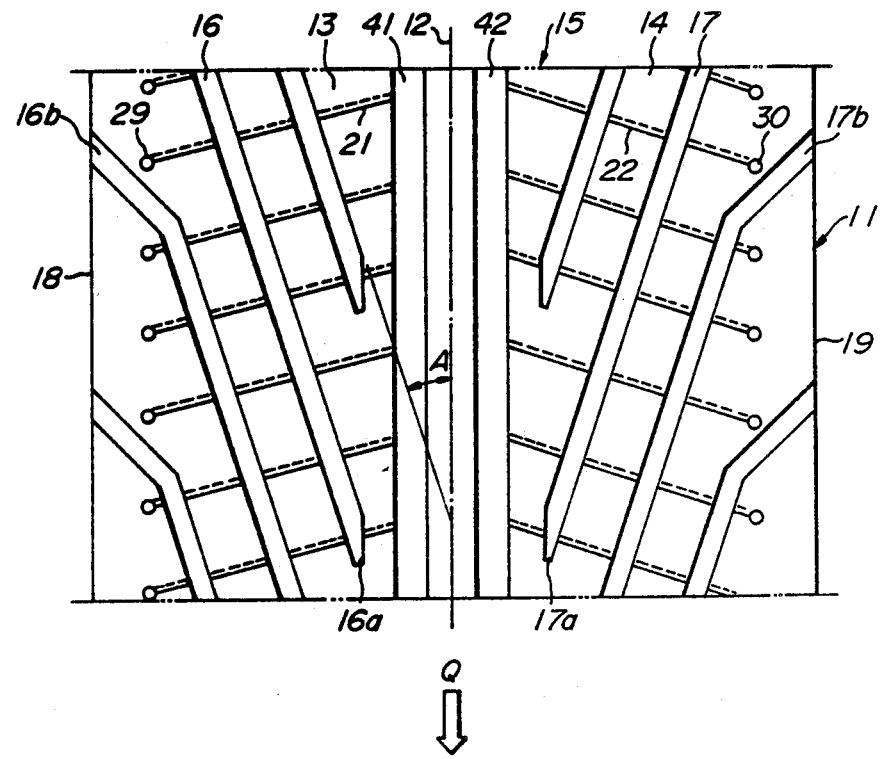
FIG_19

PNEUMATIC TIRE INCLUDING SIPES

This is a division of application Ser. No. 07/061,521 filed June 15, 1987.

BACKGROUND OF THE INVENTION

This invention relates to a pneumatic tire having improved in wet performance.

In general, known rib type pneumatic tires, for example, disclosed in FIG. 1 have often been used for trucks and buses. The tire of this type has a tread surface 1 including a plurality of main grooves 2 extending zigzag and substantially circumferentially. With such a tire running on a wet road on which water exists, the water entering in the proximity of a tread surface of the tire contacting the road is exhausted through the main grooves 2 of the tire. However, as the main grooves 2 are zigzaged, the water collides with sidewalls of the zigzag grooves many times and is obliged to turn its flowing directions. As a result, the flowing efficiency of the water flowing through the main grooves 2 is low. Therefore, the main grooves 2 are filled with the water. As there is no space for receiving water between the tread surface and the road, the water further enters between the tread surfaces and the road. From this fact, the rib type tire exhibits only narrow surface area contacting the road and poor wet performance. The wet performance means a faculty of a tire running on a road on which water exists.

In order to improve the wet performance, a pneumatic tire has been proposed, which is as disclosed in specification U.S. Pat. No. 4,299,264. As shown in FIG. 2, this proposed tire has a tread surface 3 including a plurality of main grooves 4 circumferentially extending and a plurality of main grooves 5 circumferentially spaced apart from each other and inclined to an equatorial plane 6 of the tire to ensure passages for causing water to flow laterally.

With such a pneumatic tire, the water entering within a zone of the tread of the tire is exhausted through both the main grooves 4 and 5 of the tire. However, as these main grooves 4 and 5 intersect with each other at a great number of positions, the water flowing through the main groove 4 and 5 collides with each other at these intersections so a to be disturbed with each other to lower the drainage faculty of the tire. As a result, the main grooves 4 and 5 are under a condition filled with the water which does not flow very well, and the water between the tread and the road does not have any space into which the water escapes. Moreover, part of water within the zone of the tread is exhausted through the main grooves 4 into immediate front of the tread, so that the water increases at the location immediately before the tire in a running direction. From the above fact, the water enters deeply between the tread and the road to make narrow the surface area of the tire contacting the road, so that the wet performance could not be improved very much. This is particularly acute in a flat tire whose contacting length is short.

SUMMARY OF THE INVENTION

It is a principal object of the invention to provide an improved pneumatic tire which eliminates all the disadvantages of the prior art and which is able to prevent water from entering between a tread of the tire and a road surface, thereby increasing contacting area of the tire with the road surface.

It is another object of the invention to provide a pneumatic tire which is superior in wet performance, particularly in braking and cornering on a wet road.

In order to achieve these objects, a pneumatic tire according to the invention comprises a plurality of main grooves in a tread of the tire, said main grooves substantially circumferentially extending and spaced apart from each other in an axial direction of the tire, each said main groove being continuous and intersection angles between an equatorial plane of the tire and tangents to each the main groove being increasing as approaching from a starting end of the main groove to a terminal end opening at a tread end of the tire.

In another aspect of the invention, a pneumatic tire comprises a plurality of sipes in a tread of the tire, said sipes extending substantially in axial directions of the tire but inclined relative to an equatorial plane of the tire and spaced apart from each other in circumferential directions, each said sipe being inclined with its opening directing forward in a rotating direction of the tire.

With the above arrangement, water in a zone of a contacting surface of the tire running on a wet road is exhausted through the plurality of the main grooves whose intersection angles with an equatorial plane of the tire are larger from starting ends to terminal ends of the main grooves, so that the water is dispersed widely and part of the water is exhausted laterally. As a result, the water entering onto a tread of the tire is dispersed to decrease the water in front of the tread. The water between a road surface and the tread of the tire passes through the main grooves which are continuous and not discontinuous without having intersections or branched portions, so that the water flows smoothly at high speeds through the main grooves to improve the drainage efficiency. Therefore, the water scarcely enters between the tread of the tire and the road surface, so that the contacting area of the tire with the road surface is increased to improve the wet performance of the tire.

The invention will be more fully understood by referring to the following detailed specification and claims taken in connection with the appended drawings.

BRIEF DESCRIPTION OF THE DRAWINGS

FIG. 2 is a plan view of a tread of another tire of the prior art;

FIG. 3 is a plan view of a tread illustrating a first embodiment of the invention;

FIG. 4 is a graph illustrating a relation between the intersection angles A and the wet $\mu$ indexes;

FIG. 5 is a sectional view taken along the line V—V in FIG. 3;

FIG. 6 is a sectional view taken along the line VI—VI in FIG. 3;

FIG. 7 is a sectional view taken along the line VII—VII in FIG. 3:

FIG. 8 is a graph illustrating heel and toe wear with variation in circumferential pitch of the main grooves;

FIG. 9 is a graph illustrating wear amounts with variation in negative ratio;

FIG. 10 is a graph similar to FIG. 9;

FIG. 11 is a sectional perspective view in the proximity of a roof-shaped sipe illustrating one sidewall;

FIG. 12 is a sectional view taken along the line XII—XII in FIG. 3;

FIG. 13 is a graph illustrating a result of wet test;

FIG. 14 is a bottom plan view of a tread for external forces acting upon sipes of the tire according to the invention;

FIG. 15 is a sectional view similar to FIG. 12 for explaining conditions of the sipe subjected to an external force;

FIG. 16 is a perspective view of a main portion of the tire of a second embodiment to be equipped to a right side of a vehicle according to the invention;

FIG. 17 is a perspective view similar to FIG. 16, illustrating a left side tire according to the invention;

FIG. 18 is a bottom plan view of a vehicle equipped with the tires shown in FIGS. 16 and 17;

FIG. 19 is a plan view of a tread of a tire of a third embodiment according to the invention;

DESCRIPTION OF THE PREFERRED EMBODIMENTS

Figure 1:
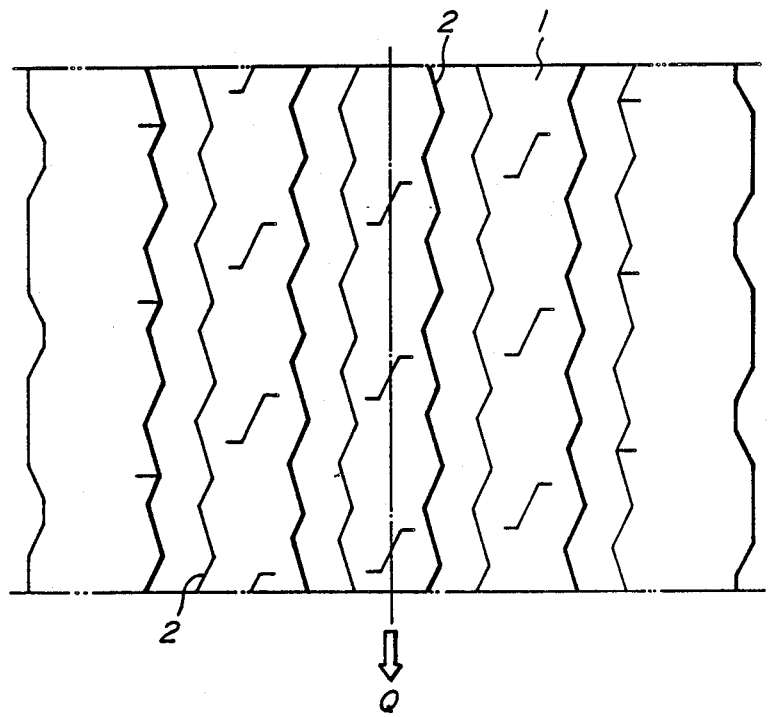
FIG. 1 is a plan view illustrating a tread of a rib type tire of the prior art.

FIG. 3 illustrates a tread 15 of a pneumatic tire 11 for trucks, buses and the like, the tread 15 being divided by an equatorial plane 12 of the tire into first and second tread portions 13 and 14 on both sides of the equatorial plane 12. Surfaces of the first and second tread portions 13 and 14 on both the sides of the equatorial plane 12 are formed with a plurality of main grooves 16 and 17 spaced apart from each other with a pitch P in circumferential directions. The main grooves 16 and 17 are circumferentially shifted to each other with a pitch of ½P, but are arranged in line symmetry with respect to the equatorial plane 12. These main grooves 16 and 17 extend substantially in circumferential directions and incline in a manner that as the grooves approach the equatorial plane 12, they project forward in the rotating direction Q of the tire 11. (The direction Q is such a direction in which the contacting of the tire with a road starts earlier.) In other words, this tire has a determined rotating direction in connection with an advancing direction of a vehicle on which the tire is equipped. As a result, the main grooves 16 and 17 initially contact the road at their inner or starting ends 16a and 17a and finally contact the road at their outer or terminal ends 16b and 17b. Intersection angles A of tangents L at points on the main grooves 16 and 17 thereto with the equatorial plane 12 progressively increase from the starting ends 16a and 17a to the terminal ends 16b and 17b. As a result, from the starting ends toward the terminal ends the main grooves 16 and 17 diverge away from the equatorial plane 12. These main grooves open at the terminal ends 16b and 17b or axial ends at both the tread ends 18 and 19. The intersection angles A are preferably within a range of 0°–60° at any position from the starting ends 16a and 17a to the terminal ends 16b and 17b of the main grooves 16 and 17. The reason is that if the intersection angle A is less than 0°, an L-shaped bent portion will occur on the way of the main groove to obstruct the flowing of the water. The intersection angles A more than 0° mean that the main grooves 16 and 17 do not bend zigzag. On the other hand, if the angle A is more than 60°, the wet performance will lower as shown in FIG. 4. FIG. 4 illustrates results of peak $\mu$ (maximum coefficient of friction) measured when a tractor equipped with the tires 11 was drawn at a speed of 60 km/hour. Average values of the peak $\mu$ are indicated as "wet $\mu$ index" in the ordinate, and intersection angles A (degree) at the terminal ends 16b and 17b of the main grooves 16 and 17 at the tread ends 18 and 19 are in the obscissa in FIG. 4. Tires of 275/70R22.5 were used in this test. In this case, the mean value of the peak $\mu$ of the rib type tires shown in FIG. 1 was assumed as 100 of the wet $\mu$ index. The mean value of the peak $\mu$ was 0.46.

Moreover, the main grooves 16 and 17 are continuous and must not intersect with each other or must not be branched. If there are such intersections or branched portions in the main grooves 16 and 17, water collides and disturb with each other at such locations to obstruct the flow of the water. However, sipes or narrow grooves may intersect with the main grooves or may be branched from the main grooves because upon contacting a road, the sipes are immediately closed and do not detrimentally affect the flow of water.

In this embodiment, moreover, widths B of the main grooves 16 and 17 progressively increase from the starting ends 16a and 17a toward the terminal ends 16b and 17b corresponding to the increase of water flowing thereinto. Accordingly, sectional areas of the main grooves 16 and 17 also progressively increase. The sectional areas of the main grooves 16 and 17 are along a section G perpendicular to the surface of the tread 15 and perpendicularly intersecting with extending directions F of the main grooves 16 and 17. A ratio of the width B (sectional area) of the main groove at the terminal end 16b or 17b to the width B (sectional area) at the starting end 16a or 17a is preferably within 1.1–2.5. If the ratio is less than 1.1, there is a risk of the wet performance being lowered because it is difficult to treat the water progressively increasing toward the terminal end 16b or 17b. If the ratio is more than 2.5, wear-resistance of the tire is considerably decreased probably to cause heel and toe wear.

Test results to ascertain these facts will be explained hereinafter. In this test, reference tires and tires according to the invention were prepared to measure values of the peak $\mu$ of the respective tires in the same testing method as above described. The reference tires included main grooves having the same cross-sectional area at any positions from starting ends to terminal ends (sectional area ratio 1.0). The tires according to the invention used in this test included main grooves 16 and 17 having cross sectional areas increasing at a constant rate from starting ends 16a and 17a to terminal ends 16b and 17b and cross-sectional areas at the terminal ends 16b and 17b being 1.5 times those at the starting ends 16a and 17a. With the reference tires, mean values of the peak $\mu$ were 0.51. Assuming that the 0.51 of the peak $\mu$ was the wet $\mu$ index 100, the wet $\mu$ indexes of the tires according to the invention were 106. The improvement of the wet performance of the tires according to the invention was clearly shown in the index values.

With the tire 11 above described, as the terminal ends 16b and 17b of the main grooves 16 and 17 extend to the tread ends 18 and 19, the rigidity in the proximity of the tread ends 18 and 19 is lower than that of the rib type tires as above described. As a result, contacting area of the tire with a road becomes smaller than that of the rib type tire above described in the event that the tires are subjected to axial forces to laterally be deformed upon cornering. In order to overcome this problem, center lines C of cross-sections of the main grooves 16 and 17 at least in the proximity of the tread ends 18 and 19 are inclined relatively to normal lines E of surfaces of the tread 15 in a manner that radially outward ends of the center lines C approach the equatorial plane 12 of the tire as shown in FIGS. 3, 5, 6 and 7. The reason why the center lines C are inclined in the proximity of the tread ends 18 and 19 is that when cornering, the contacting area of the tire changes into a triangular contacting area, thus the zone in the proximity of the tread ends inherently has a wider contacting area than that of the center of the tread, the result is that the effect for increasing the contacting area resulting from the inclination of the center lines C is increased assuming that the contacting area increases at a substantially constant rate. In this case, the center line C of cross-section of the main groove 16 or 17 is a line connecting centers of widths of the groove in the section G. In order to surely improve cornering performance of the tire, the center lines C are preferably inclined at least in the zone from the tread ends 18 and 19 to locations spaced from the tread ends by 30% of a width W of the tread. The inclination may extend over the length of the main grooves 16 and 17. Intersection angles H between the center lines C and the normal lines E are preferably increased progressively as they are further from the equatorial plane 12. The reason is that if the intersection angles H are large in the proximity of the equatorial plane 12 the rigidity of the tire near the equatorial plane 12 lowers to give rise to irregular wear thereat.

Moreover, the pitches P or circumferential distances between the main grooves 16 and 17 at the tread ends 18 and 19 are preferably within a range from 0.2 to 1.0 times the width W of the tread. If the pitch P is less than 0.2 times the width W, the heel and toe wear extraordinarily increases at the tread ends 18 and 19 as shown in FIG. 8. FIG. 8 illustrates the heel and toe wear at tread ends 18 and 19 of tires after actual vehicles equipped with the tires had run 50,000 km. In FIG. 8, an ordinate indicates values the toe wear minus heel wear and an abscissa indicates values in % obtained by dividing the circumferential pitch P by the width W of the tread. On the other hand, the range of the pitch P to the width W of the tread is more than 1.0, the number of the main grooves per unit area is too less so that drainage of the water becomes poor. The most preferable range of this value is 0.4–0.5.

A negative ratio of such a tire 11 is preferably less than 25%. If the negative ratio is more than 25%, the wear-resistance of the tire 11 tends to lower as shown in FIGS. 9 and 10 The negative ratio used herein means a ratio in % of total area of the main grooves 16 and 17 to total area of the tread 15. FIGS. 9 and 10 illustrate results of the following wear tests. In the wear tests, reference tires of the negative ratio of 27.9% and tires according to the invention of the negative ratio of 20.0% were prepared. Amounts of wear were measured after actual vehicles equipped with these tires had run 50,000 km. The tires used in the tests were of 275/70R22.5 and were filled with the normal pressure. The normal load was applied to the tires. In FIGS. 9 and 10, ordinates indicate the amount of wear mm and abscissas indicate locations to be measured. FIG. 9 shows the amount of wear at front wheels, while FIG. 10 shows those at rear wheels.

Referring to FIGS. 3, 11 and 12, the surfaces of the first and second tread portions 13 and 14 are formed with sipes or narrow grooves 21 and 22 which are closed when the tread portions contact a road. The sipes 21 and 22 extend substantially in axial directions of the tire. The sipes 21 and 22 are respectively circumferentially spaced equally apart from each other. Both the sipes 21 and 22 are so inclined that their openings 24 position forward of their bottoms 23 in a rotating direction Q of the tire or the openings 24 direct in the rotating direction Q. Inclined angles J of the sipes 21 and 22 or intersection angles between the normal lines and the sipes 21 and 22 in sections in parallel with the equatorial plane are preferably within a range of 15°–30°. The reason is that if the inclined angles J are less than 15° or more than 30°, improvement of braking performance could not be expected. An experiment to ascertain this fact will be explained hereinafter.

In this experiment, tires devoid of sipes and tires whose inclined angles J were 0°, 10°, 16°, 25° and 35° were prepared. Vehicles equipped with these tires were driven at a speed of 60 km/h and suddenly braked until the vehicles stopped. Distances between the braking and stopping were measured. With the tires devoid of sipes, distances of 38.8 m were required until stopped. A reciprocal of 38.8 was assumed as index 100 and braking indexes of the other tires were obtained. According to the results, breaking indexes were 101, 105, 108, 106 and 102 for the tires whose inclined angles J were 0°, 10°, 15°, 25° and 35°, respectively. From these results, it is understood that no improvement of braking performance is expected with tires whose inclined angles J are out of the range above described.

Moreover, the sipes 21 and 22 are inclined to the equatorial plane 12 to form roof-shaped grooves as viewed in FIG. 3 in a manner that points on the sipes are located further behind in the rotated direction Q of the tire, as they are nearer to the equatorial plane. As a result, when the tire is rotated in the normal direction Q, axially outer ends 25 and 26 of the sipes 21 and 22 initially contact road and axially inner ends 27 and 28 finally contact the road. In this embodiment, the inner end 27 and 28 are connected together each other on the equatorial plane 12. In other words, these sipes 21 and 22 are recognized that they are roof-shaped grooves which are bent at their centers and crests of the roofs direct in directions opposite to the rotating directions Q. Intersection angles K between the equatorial plane 12 and the sipes 21 and 22 are preferably within a range of 50°–80°. If the intersection angles K are less than 50°, there is a risk of the braking performance being greatly lowered. On the other hand, the intersection angles are more than 80°, improvement of cornering performance could not be expected. With respect to the intersection angles K, the cornering and braking performances are contradictory to each other. It is preferable to arrange the axially outer ends 25 and 26 of the sipes 21 and 22 in zones spaced by 40% of the tread width W from the equatorial plane. In other words, it is preferable to arrange the sipes 21 and 22 in a zone of 80% of the tread width having its center at the equatorial plane. If the outer ends 25 and 26 are positioned in the proximity of the tread ends 18 and 19 beyond the zones, there is a risk of heel and toe wear being greatly increased.

A test to ascertain this fact was carried out. In the test, tires whose sipes positioned in zones of 100% of the tread width or extended to tread ends 18 and 19, and tires whose sipes positioned in zones of 85 and 75% of the tread width from equatorial planes were prepared. In this case, inclined angles J of these tires were 27° and intersection angles K were 60°.

After running 50,000 km, differences (mm) in height at axially outer ends 25 and 26 were measured. The measured differences were 1.5 mm, 1.2 mm and 0.3 mm for the tires whose sipes were within 100%, 85% and 75%. It should be understood that if the axially outer ends 25 and 26 are arranged in the zones within 80% of tread width, the heel and toe wear could be securely prevented.

In this embodiment, moreover, there are provided circular apertures 29 and 30 extending in depth directions of the tread and connecting with the axially outer ends 25 and 26 of the sipes 21 and 22 in the first and second tread portions 13 and 14. These circular apertures 29 and 30 serve to distribute stresses occurring at the axially outer ends 25 and 26 of the sipes 21 and 22 when contacting a road, thereby preventing cracks starting from the axially outer ends 25 and 26. A preferable range of the radii r of the circular apertures 29 and 30 can be obtained by the following equation.

$$\alpha = 1 + 2\sqrt{a/r}$$

In this equation, $\alpha$ is coefficient of stress concentration and cracks could occur unless $\alpha$ is less than 2. However, the circular apertures 29 and 20 are not needed, if the axially outer ends 25 and 26 of the sipes 21 and 22 terminate in main grooves 16 and 17.

The operation of the tire of the first embodiment according to the invention will be explained hereinafter.

When a vehicle, for example, truck or bus equipped with such tires 11 run on a wet road with the tires rolling in the normal direction, water in a zone of the contacting surface of the tire 11 flows in the main grooves 16 and 17 from the starting ends 16a and 17a to the terminal ends 16b and 17b. As the main grooves 16 and 17 are continuous, the water flows smoothly without being disturbed with each other. Moreover, as the main grooves 16 and 17 are within the angle ranges of 0°–60° without forming zigzag shapes, the water flows smoothly at high speeds in the main grooves 16 and 17. The water is exhausted at high speeds from the openings of the main grooves 16 and 17 located at circumferential peripheries of the contacting surface of the tire 11. Since the intersection angles A of the main grooves 16 and 17 with the equatorial plane 12 progressively increase toward the terminal ends 16b and 17b, the exhausting directions of the water outwardly diverge so that part of the water is exhausted laterally of the tire 11. As a result, water flowing immediately into front of the tread of the tire 11 is dispersed so that the amount of the water in front of the tread is decreased. Therefore, water scarcely enters between the tread of the tire 11 and the road so that the contacting area of the tire increases to improve the wet performance of the tire.

FIG. 13 illustrates results of a wet test. In this test, tires according to the invention and rib type tires of the prior art were prepared. These tires were of 275/70R22.5 having tread radii of 680 mm. Negative ratios were 20.0% and 27.9% for the tires according to the invention and of the prior art, respectively. As can be seen from the results shown in FIG. 13, the wet performance of the tires according to the invention is remarkably improved over all the running speeds in comparison with those of the prior art. If the results shown in FIG. 13 are indicated by wet $\mu$ index, the values of the tires according to the invention are 100 at 40 km/h, 103 at 60 km/h and 104 at 70 km/h, while the values of the tires of the prior art are 97 at 40 km/h, 94 at 60 km/hr and 91 at 70 km/h. The higher the running speed, the clearer the difference in wet performance between the tires according to the invention and of the prior art.

When the running truck as above described is turned for example, to the right into a direction shown by an arrow U in FIG. 3, a great centrifugal force acts on the tires 11 equipped on the truck to laterally deform contacting portions of the tires 11 with a road. As a result, the main grooves 17 on the outer side of turning or on the side of the tread end 19 are so deformed that center axes C in cross-sections of the main grooves 17 are further inclined so as to approach the equatorial plane 12. In this embodiment, the main grooves 17 are inclined relative to the equatorial plane 12 to direct forward in the rotating direction Q as the main grooves 17 approach the equatorial plane 12. The center axes C in sections of the main grooves 17 at least in the proximity of the tread end 19 are inclined axially inwardly relative to the normal lines E perpendicular to the surface of the tread 15. In the inclined main grooves 17, therefore, intersection angles R between the surface of the tread 15 and the sidewalls 17c on the side approaching the equatorial plane 12 are obtuse angles more than 90°, so that the sidewalls 17c of the main grooves 17 somewhat protrude as shown in phantom lines in FIG. 7 and portions of the sidewalls 17c near to the openings are brought into contact with the road. The decrease in contacting are is prevented in this manner, notwithstanding that there is a tendency of the contacting area to decrease due to the lower rigidity in the proximity of the tread end 19 of the tire 11 as above described when axial forces caused by cornering act upon the tire. Furthermore, the cornering performance is also improved by the increase of the contacting area.

In this case, the contacting surface or foot print of the tire changes into substantially triangular shape whose one side is the tread end 19 as above described. On the other hand, the increase of the contacting area is achieved at least in the proximity of the tread end 19 on the outer side of the turning where the contacting area is inherently wide. Therefore, the increase in the contacting area is effectively accomplished.

When the truck is turned to the left, the main grooves 16 on the side of the tread end 18 are deformed to incline the center axes C in sections of the main grooves 16 axially inwardly. As a result, portions of the sidewalls 16c of the main grooves 16 near to the openings are brought into contact with the road so as to increase the contacting area to improve the cornering performance.

In order to ascertain the above facts, a test was carried out, which will be explained hereinafter. Following three kinds of tires were prepared, the first of which were tires whose center axes of main grooves 16 and 17 in section were inclined according to the invention and second and third of which were reference tires whose center axes C of main grooves 16 and 17 were in parallel with normal lines E or intersection angles H were zero, and were prior art rib type tires (center axes C in section in parallel with normal lines E). All of these tires were of 275/70R22.5. Intersection angles H at points X, Y and Z in the main grooves 16 and 17 (FIG. 3) were 7.63°, 15.12° and 15.12° for the above respective three kinds of tires. These tires were equipped on a truck having no load and filled with normal pressure. Then, the truck was turned on a wet road with constant radii at maximum speeds. The maximum speeds were then multiplied by themselves and divided by the turning radii to obtain centrifugal accelerations G. With the reference tires, ratios of the centrifugal accelerations G to the gravitational acceleration were 0.307. Assuming that the centrifugal acceleration G of the reference tires was index 100, the centrifugal acceleration index of the tires according to the invention was 112 and that of the tires of the prior art was 109. It is clearly evident that the tires according to the invention are higher in centrifugal acceleration than the reference tires and the tires of the prior art, and the tires according to the invention are also improved in cornering performance.

Moreover, when the tires 11 of the running truck as above described are subjected to braking force, frictional braking force N in the rotating direction Q acts on a contacting surface of the tire 11 from a road surface 31 as shown in FIGS. 14 and 15 to deform or bend the rubber of the tread portion 15 between the sipes 21 and 22 in the rotating direction Q of the tire. As the sipes 21 and 22 extend substantially in axial directions and are inclined so as to direct forwardly in the rotating direction Q from the deepest portions or bottoms 23 to the opening portions 24 of the sipes, edges 32 of the opening portions 24 of the sipes 21 and 22 on the forward side of the rotating direction Q are at obtuse angles. As a result, when the rubbers between the sipes 21 and 22 are bent and deformed, sidewalls 33 in the proximity of the opening portions 24 of the sipes 21 and 22 on the forward side of the rotating direction Q are brought into contact with the road 31. The contacting area is increased to securely improve the braking performance of the tire in this manner.

On the other hand, when the running truck is turned to the left a frictional force as an axial input force S is applied from the road to the contacting surface of the tire 11 in a direction shown by an arrow in FIG. 14. As a result, rubbers between the sipes 21 in the tread portion 15 are bent and deformed in the direction of the axial input force S in the same manner as above described. In this case, as the sipes 21 are formed so inclined as to direct the direction opposite to the rotating direction Q as approaching the equatorial plane 12, the sipes are inclined so as to direct in the direction of the axial input force S as approaching from the bottoms 23 to the opening portions 24. As a result, the sidewalls of the sipes 21 on the forward side of the axial input force S are brought into contact with the road surface 31 with the aid of the deformation of the sidewalls due to the input force S so as to increase the contacting area to securely improve the cornering performance of the tire. In turning to the left, the contacting surface or foot print of the tire changes into substantially triangular shape whose one side is the tread end 18 owing to the lateral movement of the tire 11 due to centrifugal force. On the other hand, the zone increasing the contacting area is on the side of the tread end 18 on the outer side of the turning where the contacting area is inherently wide. Therefore, the increase in the contacting area is effectively accomplished.

When the truck is turned to the right, an axial input force T is applied to the contacting surface of the tire from the road surface 31 in a direction shown by an arrow in FIG. 14. As the sipes 22 are formed so inclined as to direct the direction opposite to the rotating direction Q as approaching the equatorial plane 12, the sidewalls of the sipes 22 on the forward side of the axial input force T are brought into contact with the road surface 31 with the aid of the deformation of the sidewalls due to the axial input force T. As a result, the contacting area of the tire is increased. Moreover, when the tire is subjected to a force such as the axial input force S or T, intersection angles V between the sipes 21 and 22 and the normal lines E in sections cutting the sipes 21 and 22 in planes including the axis of the tire 11 greatly affect the increase in contacting area of the tire.

FIGS. 16, 17 and 18 illustrate a second embodiment of the invention. In this embodiment, the tire 35 or 36 is formed with sipes 37 or 38 linearly extending over an equatorial plane 12. In the tire 35, the sipes 37 are inclined forward in a rotating direction Q of the tire as the sipes 37 approach from a tread end 19 to a tread end 18. In the tire 36, on the other hand, the sipes 38 are inclined forward in a rotating direction Q of the tire as the sipes 38 approach from a tread end 18 to a tread end 19. When the tire 35 is subjected to an axial input force in a direction from the tread end 18 to the tread end 19, the contacting area is increased. Therefore, the tires 35 are equipped on a vehicle 39 on the right side thereof as shown in FIG. 18 which is a bottom plan view of the vehicle. On the other hand, when the tire 36 is subjected to an axial force in a direction from the tread end 19 to the tread end 18, the contacting area is increased. The tires 36 are equipped on the vehicle on the left side thereof as shown in the bottom plane view of FIG. 18. As a result, for example, when the vehicle 39 is turned to the left and the tires 35 on the right are subjected to large axial input forces toward the left, the sipes 37 of the tires 35 are deformed to increase the contacting area. On the other hand, when the vehicle 39 is turned to the right and the tires 36 on the left ar subjected to large axial input forces toward the right, the sipes 38 of the tires 36 are deformed to increase the contacting area. The cornering performance is improved when the vehicle is turned in any sides. Moreover, the sipes 37 and 38 of these tires 35 and 36 extend substantially axial directions, so that the braking performance is improved in the same manner as above described.

FIG. 19 illustrates a third embodiment of the invention. In this embodiment, a tread of a tire includes main grooves 16 and 17 which are linear but include bent portions between starting ends 16a and 17a and terminal ends 16b and 17b to increase intersection angles A stepwise, and further main grooves 41 and 42 circumferentially extending in the proximity of an equatorial plane on both sides thereof without intersecting the main grooves 16 and 17.

Figure 20:
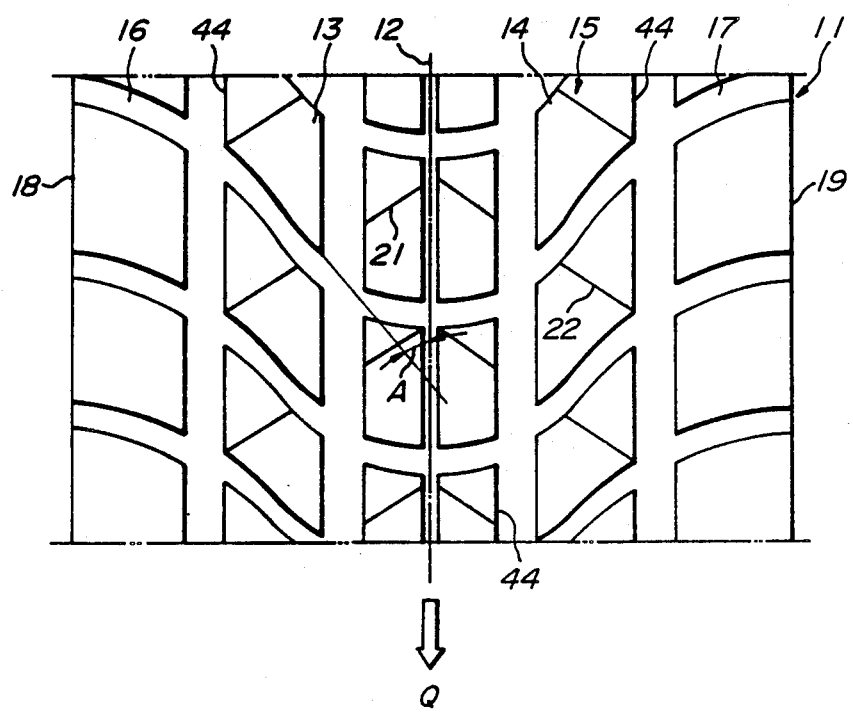
FIG. 20 is a plan view of a tread of a tire of a fourth embodiment according to the invention.

FIG. 20 illustrates a fourth embodiment of the invention. In this embodiment, a tread of a tire includes main grooves 16 and 17 and a plurality of main grooves 44 circumferentially extending and intersecting the main grooves 16 and 17 in tread portions 15 and both sides of an equatorial plane 12. Intersection angles A are relatively small in the proximities of the equatorial plane 12 and tread ends 18 and 19 and relatively large between the equatorial plane 12 and the tread ends 18 and 19.

Figure 21:
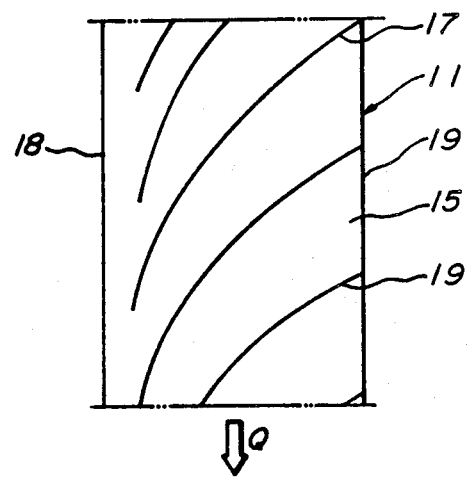
FIG. 21 is a plan view of a tread of a tire of a fifth embodiment of the invention.
Figure 22:
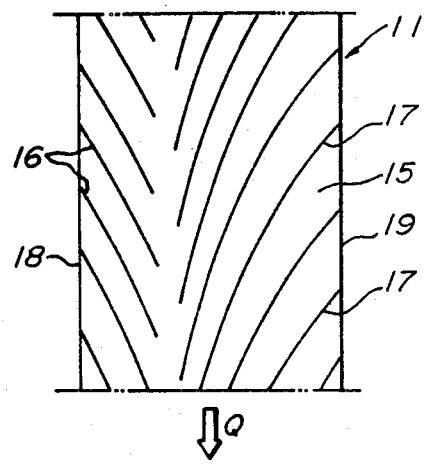
FIG. 22 is a plan view of a tread of a tire of a sixth embodiment of the invention.

Although the main grooves 16 and 17 are of substantially arcuate curves whose intersection angles A are continuously changed in the above embodiments, the intersection angles A may be discontinuously changed as in the third embodiment or the main grooves 16 and 17 may consist of a plurality of straight grooves connected and intersecting at obtuse angles according to the invention. As in fifth and sixth embodiments shown in FIGS. 21 and 22 according to the invention, only main grooves 17 may be provided which are inclined only in one direction, and main grooves 16 and 17 may be arranged so as to permit an axis of symmetry to be shifted toward either one of tread ends.

As can be seen from the above explanation, with the tire according to the invention water scarcely enters between a tread of the tire and a road surface so that contacting area of the tire is increased to improve the wet performance of the tire.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A pneumatic tire comprising; a plurality of sipes in a tread of the tire, said sipes extending substantially in axial directions of the tire but inclined relative to an equatorial plane of the tire and spaced apart from each other in circumferential directions, each said sipe being inclined with its opening on a tread surface being positioned forward of a sipe bottom in a rotating direction of the tire, said sipes arranged on both sides of said equatorial plane and sipes extending from both sides of the equatorial plane connected at the equatorial plane to form V-shaped sipes, axially outer ends of said sipes extending from both sides of the equatorial plane are positioned forward of axially inner ends located at the equatorial plane in said rotating direction of said tire, and wherein intersection angles between the sipes and the equatorial plane are within the range of 50°–80°.

2. A pneumatic tire as set forth in claim 1, wherein said sipes are arranged within a zone of 80% of a tread width having its center at an equatorial plane of the tire.

3. A pneumatic tire as set forth in claim 1, wherein intersection angles between said sipes and normal lines perpendicular to a tread surface in a sectional surface in parallel with said equatorial plane are within a range of 15°–30°.

4. A pneumatic tire as set forth in claim 1, wherein there are provided circular apertures extending in depth direction of the tread and connecting with axially outer ends of said V-shaped sipes.

* * * * *